May 27, 1930. P. R. FORMAN 1,760,052

EXPANDER

Filed Sept. 24, 1927

Inventor
Paris R. Forman
By his Attorneys Darby + Darby

Patented May 27, 1930

1,760,052

UNITED STATES PATENT OFFICE

PARIS R. FORMAN, OF RAHWAY, NEW JERSEY, ASSIGNOR TO NATIONAL PNEUMATIC COMPANY, OF NEW YORK, N. Y., A CORPORATION OF WEST VIRGINIA

EXPANDER

Application filed September 24, 1927. Serial No. 221,840.

This invention relates to an expanding device for positively forcing piston washers against its cylinder wall.

One of the objects of this invention is the provision of a resilient toothed disc which is simple in construction and which thoroughly carries out the object of spreading the piston washer against the cylinder walls.

A further object of this invention is the provision of a device of this type which may readily be assembled into operative relation with respect to the piston washer.

This and other objects are obtained by means of this invention.

This invention resides substantially in the combination, construction, arrangement and relative location of parts as will be brought out in the following disclosure.

Referring to the drawings.

It has been found in practice that some form of means is necessary in order to secure a positive seating of the piston washer against the walls of the cylinder. This invention comprises a very simple device for carrying out this function which is adapted for adjusting the pressure of the piston washer against the cylinder wall.

Figure 1:
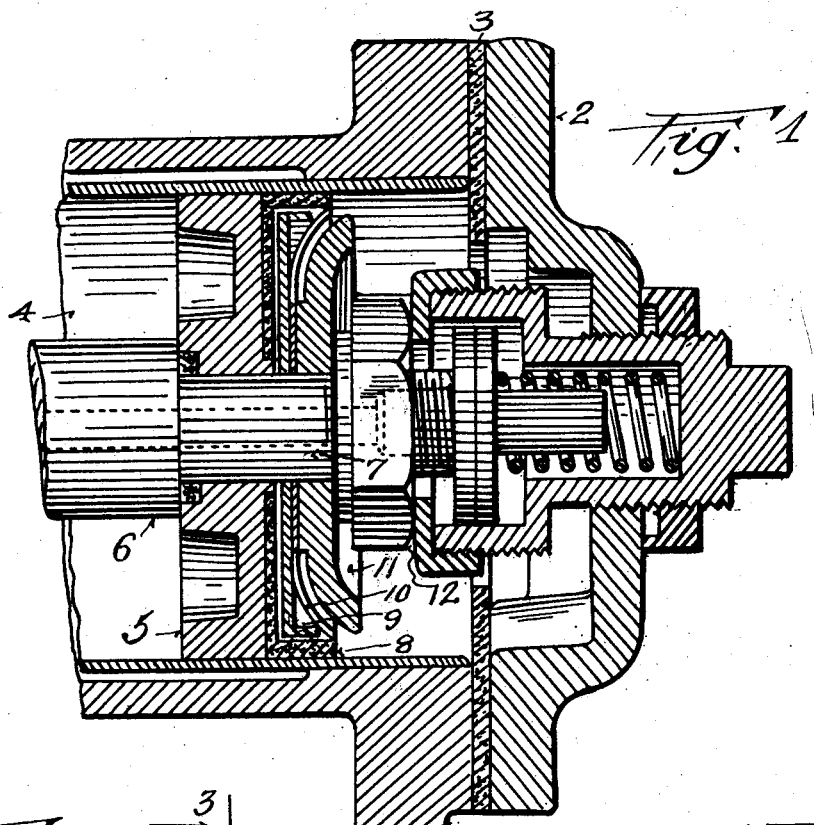
Figure 1 is a vertical cross-sectional view through a fluid pressure engine showing the application of my invention thereto.
Figure 2:
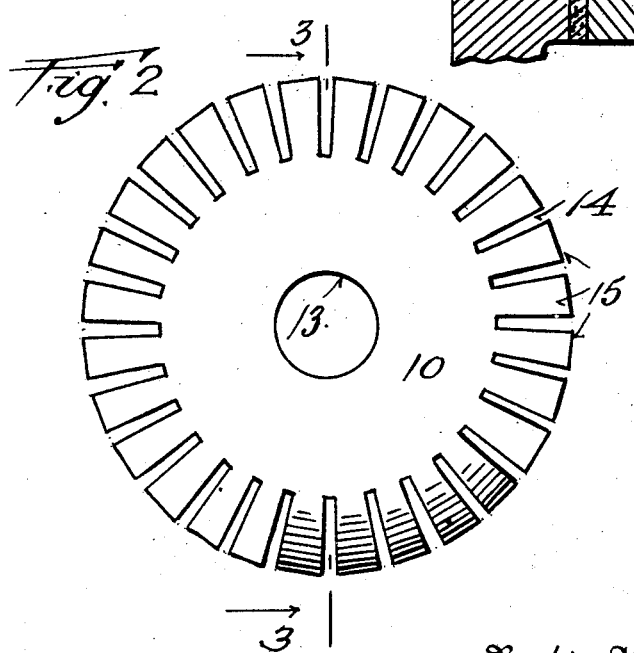
Figure 2 is a top plan view of the expander disc.
Figure 3:
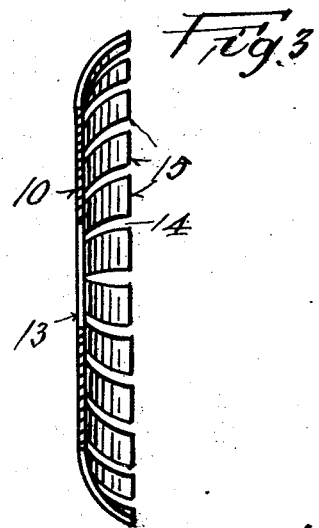
Figure 3 is a cross-sectional view of the disc taken on the line 3—3 of Figure 2.

Referring to the drawings the cylinder is shown at 1 having the end member 2 forming a fluid type joint therewith by means of the washer 3. The cylinder is shown having the usual liner 4 which may or may not be used as desired. The piston head 5 is shown mounted against a shoulder formed on the piston rod 6 by reason of the reduced portion 7. The piston washer is shown at 8 and is usually of larger diameter than the cylinder bore so as to be cup-shaped when forced therein. A cup-shaped member is shown at 9 somewhat smaller in diameter than the cylinder bore and is arranged to pass over the reduced portion 7 and lie against and within the cup washer 8. The expander device is shown at 10 and in one form of construction may be made of resilient metal having a series of radial slots 14 extending in from the circumference to form the radial circumferential teeth 15. This disc 10 is normally flat and may be, if desired, slightly larger than the bore of the cylinder. The disc 5 has a central hole 13 to receive the reduced portion 7 of the piston rod and is forced into positive engagement with the piston washer by means of the member 11 which firmly holds the piston 5, washer 8, member 9 and expander 10 in cooperation with the nut 12 which threads on to the reduced portion 7. When the expander 10 is clamped into operative position as shown in Figure 1 it assumes a cup-shaped formation. As is shown in Figure 3 the resilient teeth 15 tend to expand outwardly and being in contact with the washer 8 as shown in Figure 1 they force the washer 8 to positive engagement with the cylinder wall. By adjusting the nut 12 to vary the pressure on the expander 10 it is possible to control the pressure of the washer against the cylinder wall.

From the foregoing disclosure the principles of operation of my device will be apparent to those skilled in the art and since changes in the application of these principles will readily occur to those skilled in the art I do not desire to be limited to the particular construction disclosed by me but rather to the scope of the appended claims.

What I seek to secure by United States Letters Patent is:

1. An expander for piston washers comprising a flat disc of resilient material said disc having a central opening and a series of radial slots extending from the circumference of the disc to form radial circumferential teeth.

2. The combination with a cylinder having a piston therein of a washer on said piston for forming a sliding seat with said cylinder and a normally flat radially slotted resilient disc cooperating with said washer to assume a cup-shaped formation to expand said washer into contact with the cylinder walls.

3. The combination with a cylinder having a piston therein of a washer on said piston for forming a sliding seat with said cylinder, a normally flat radially slotted resilient disc resting against the piston washer and means cooperating therewith for causing said disc to expand said washer against the piston walls.

4. The combination with a cylinder having a piston therein of a washer on said piston for forming a sliding seat with said cylinder, a normally flat radially slotted disc having a flexible circumferential portion and means on said piston for causing said disc to assume a cupped shape to expand the washer against the cylinder walls.

5. The combination with a cylinder having a piston therein of a washer on said piston for forming a sliding seat with said cylinder, a normally flat resilient disc having a plurality of radial, circumferential teeth, said disc being in contact with said washer and means for cupping said disc to produce an expanding contact with said washer.

6. The combination with a cylinder having a piston therein of a washer on said piston for forming a sliding seat with said cylinder, a normally flat resilient disc having a plurality of radial, circumferential teeth, said disc being of larger diameter than the internal bore of the cylinder and means for causing the disc to take a cup-shape formation to force the washer against the cylinder walls.

In testimony whereof I have hereunto set my hand on this 19th day of September, A. D. 1927.

PARIS R. FORMAN.